(12) United States Patent
Kanellis

(10) Patent No.: US 8,477,062 B1
(45) Date of Patent: *Jul. 2, 2013

(54) RADAR-BASED SYSTEM, MODULE, AND METHOD FOR PRESENTING STEERING SYMBOLOGY ON AN AIRCRAFT DISPLAY UNIT

(75) Inventor: George R. Kanellis, Tigard, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 589 days.

This patent is subject to a terminal disclaimer.

(21) Appl. No.: 12/569,758

(22) Filed: Sep. 29, 2009

(51) Int. Cl.
*G01S 13/94* (2006.01)
*G01S 13/95* (2006.01)

(52) U.S. Cl.
USPC .............. 342/65; 342/26 B; 342/29; 340/979

(58) Field of Classification Search
USPC .......................................................... 342/65
See application file for complete search history.

(56) References Cited

U.S. PATENT DOCUMENTS

| | | | | |
|---|---|---|---|---|
| 3,025,514 A | * | 3/1962 | Alexander et al. | 342/29 |
| 3,611,300 A | * | 10/1971 | Aldrich et al. | 712/34 |
| 3,740,750 A | * | 6/1973 | Moulton | 342/432 |
| 3,781,530 A | * | 12/1973 | Britland et al. | 701/301 |
| 5,086,396 A | * | 2/1992 | Waruszewski, Jr. | 701/458 |
| 5,892,462 A | * | 4/1999 | Tran | 340/961 |
| 6,424,889 B1 | * | 7/2002 | Bonhoure et al. | 701/3 |
| 6,486,799 B1 | * | 11/2002 | Still et al. | 340/974 |
| 6,529,821 B2 | * | 3/2003 | Tomasi et al. | 701/467 |
| 6,546,338 B2 | * | 4/2003 | Sainthuile et al. | 701/301 |
| 7,064,680 B2 | * | 6/2006 | Reynolds et al. | 340/961 |
| 7,295,901 B1 | * | 11/2007 | Little et al. | 701/16 |
| 7,337,043 B2 | * | 2/2008 | Bull | 701/1 |
| 7,512,462 B2 | * | 3/2009 | Nichols et al. | 701/3 |
| 7,570,177 B2 | * | 8/2009 | Reynolds et al. | 340/961 |
| 7,965,223 B1 | * | 6/2011 | Mccusker | 342/29 |
| 8,019,491 B1 | * | 9/2011 | McCusker | 701/4 |
| 8,068,038 B2 | * | 11/2011 | Engels et al. | 340/970 |
| 8,090,526 B2 | * | 1/2012 | Marty et al. | 701/3 |
| 8,354,943 B2 | * | 1/2013 | Bacabara et al. | 340/973 |
| 2004/0181318 A1 | * | 9/2004 | Redmond et al. | 701/9 |
| 2009/0040070 A1 | * | 2/2009 | Alter et al. | 340/945 |
| 2010/0250030 A1 | * | 9/2010 | Nichols et al. | 701/7 |
| 2011/0213513 A1 | * | 9/2011 | Naderhirn | 701/3 |

OTHER PUBLICATIONS

U.S. Appl. No. 11/904,491, filed Sep. 29, 2007, McCusker et al.
U.S. Appl. No. 12/069,234, filed Feb. 8, 2009, Wichgers et al.
U.S. Appl. No. 12/321,112, filed Jan. 15, 2009, Young et al.
Rockwell Collins, "Rockwell Collins WXR-2100 MultiScan Weather", Sep. 2007, Cedar Rapids, Iowa.

* cited by examiner

*Primary Examiner* — Matthew M Barker
(74) *Attorney, Agent, or Firm* — Donna P. Suchy; Daniel M. Barbieri (57) ABSTRACT

A novel and non-trivial radar-based system, module, and method for presenting steering symbology on an aircraft display unit are disclosed. Hazard information acquired from a forward-looking aircraft radar system may be presented as hazard data to a symbology generating processor. A plurality of minimum turn angles may be determined based upon the boundary tangents of the hazard data. Data representative of steering symbology corresponding to a one or more minimum turn angles may be generated, where the symbology may take the form of textual symbology and/or non-textual symbology. Then, the steering symbology data may be provided to a presentation system for depiction of steering symbology on a tactical display unit and/or strategic display unit.

20 Claims, 6 Drawing Sheets

RADAR-BASED SYSTEM, MODULE, AND METHOD FOR PRESENTING STEERING SYMBOLOGY ON AN AIRCRAFT DISPLAY UNIT

BACKGROUND OF THE INVENTION

1. Field of the Invention

This invention pertains generally to the field of cockpit indicators or display units that provide flight information to the pilot or flight crew of an aircraft.

2. Description of the Related Art

Forward-looking radar systems are well-known to those skilled in the art for acquiring and presenting information on a display unit. A common example of a forward-looking radar system is a weather radar system. This traditional or classic forward-looking radar system may be comprised of, in part, a transceiver and antenna. A transceiver may transmit microwaves within a sweep zone into the atmosphere via an antenna which, in turn, produces a focused beam. The transceiver may control the direction of the beam by steering the antenna horizontally and vertically. When the signal strikes or reflects off atmospheric meteorological conditions, part of the microwave energy is reflected back and received by the antenna. Based upon the acquired signals received by the antenna, the location of one or more hazards comprising hazard data could be determined. This information may be subsequently presented on a display unit, often in different colors to distinguish between levels of threat posed by the meteorological conditions.

In recent years, there has been a departure from the traditional or classic use of weather radar systems. Newer technologies have expanded the use of forward-looking radar systems. Once such system is the WXR-2100 MultiScan Hazard Detection Weather Radar System ("Hazard Detection System") that has been developed by Rockwell Collins. The Hazard Detection System could employ an automatic weather sensor operative to 320 nautical miles that displays not only classic precipitation rates but also significant weather hazards without pilot manipulation of tilt or gain settings typical of classic weather radar systems. The Hazard Detection System has many key features including, but not limited to, forward-looking windshear detection with turbulence alerts, geographic weather conditions, true zero automatic antenna misalignment compensation, overflight and predictive overflight protection, enhanced turbulence detection, flight phase hazard analysis, and storm top information. The Hazard Detection System could also include vertical display of range and height indicator, enhanced ground clutter suppression, and path attenuation compensation. Although the Hazard Detection System employs a means for suppressing ground clutter, data associated with ground clutter may be employed as a source of providing terrain information in a terrain awareness and warning system ("TAWS"). When employed in a TAWS, hazard data representative of terrain information is acquired from a forward-looking radar system.

Current uses of the hazard data acquired from a forward-looking radar system include, but are not limited to, the depiction of hazards on display units and a source of proving hazard data in the construction a flight path around a hazard. One such example has been disclosed by Young et al in U.S. Pat. No. 8,234,068 entitled "System, Module, and Method for Constructing a Flight Path Used by an Avionics System." While a forward-looking radar system has been used in this manner, it has been used in conjunction with a source of flight plan data such as a flight management system ("FMS") and not as the sole source for determining a flight avoidance path around the acquired hazard(s) and/or the display of symbology corresponding to the path, where such symbology presents the pilot a visual steering cue for avoiding such hazard

BRIEF SUMMARY OF THE INVENTION

A novel and non-trivial radar-based system, module, and method for presenting steering symbology on an aircraft display unit. The use of steering symbology can be used by a pilot to enhance his or her situational awareness by providing steering information for avoiding unsafe or hazardous flight condition(s).

In one embodiment, a system is disclosed for presenting information on an aircraft display unit with the use of steering symbology. The system comprises a forward-looking aircraft radar system, a symbology generating processor ("SG processor"), and a presentation system. The SG processor could receive hazard data from a forward-looking aircraft radar system, determine one or more minimum turn angles based upon one or more boundary tangents of the hazard data, and generate steering symbology data corresponding to one or more minimum turn angles. After the steering symbology data has been generated, the SG processor could provide to a presentation system, whereby textual and/or non-textual symbology data is depicted on a tactical display unit and/or strategic display unit. As embodied herein, the hazard data could comprise one or more levels of threat. As embodied herein, the hazard data could include track alignment correction information which, in turn, could adjust the minimum turn angles. As embodied herein, the SG processor may be a processor used in any aircraft system including, but not limited to, a forward-looking aircraft radar system and presentation system.

In another embodiment, a module is disclosed for presenting information on an aircraft display unit with the use of steering symbology. The module comprises an input communications interface, an SG processor, and an output communications interface. The input communications interface could facilitate the receipt of hazard data. The SG processor could receive hazard data, determine one or more minimum turn angles based upon one or more boundary tangents of the hazard data, and generate steering symbology data corresponding to one or more minimum turn angles. The output communications interface could facilitate the providing of steering symbology data to a presentation system, whereby textual and/or non-textual symbology data is depicted on a tactical display unit and/or strategic display unit. As embodied herein, the hazard data could comprise of one or more levels of threat. As embodied herein, the hazard data could include track alignment correction information which, in turn, could adjust the minimum turn angles. As embodied herein, the module may be a module used in any aircraft system including, but not limited to, a forward-looking aircraft radar system and presentation system. A module could be, but is not limited to, a printed circuit board (either in whole or in part) installed in a line replaceable unit.

In another embodiment, a method is disclosed for presenting information on an aircraft display unit with the use of steering symbology. The method comprises receiving hazard data for a forward-looking aircraft radar system, determining one or more minimum turn angles based upon one or more boundary tangents of the hazard data, generating steering symbology data corresponding to one or more minimum turn angles, and providing the steering symbology data to a presentation system, whereby textual and/or non-textual symbology data is depicted on a tactical display unit and/or strategic display unit. As embodied herein, the hazard data could comprise one or more levels of threat. As embodied herein, the hazard data could include track alignment correction information which, in turn, could adjust the minimum turn angles.

BRIEF DESCRIPTION OF THE DRAWINGS

The drawings of FIG. 3 provide a first set of exemplary depictions of display units presenting steering symbology.

The drawings of FIG. 4 provide a second set of exemplary depictions of display units presenting steering symbology.

The drawings of FIG. 5 provide a third set of exemplary depictions of display units presenting steering symbology.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
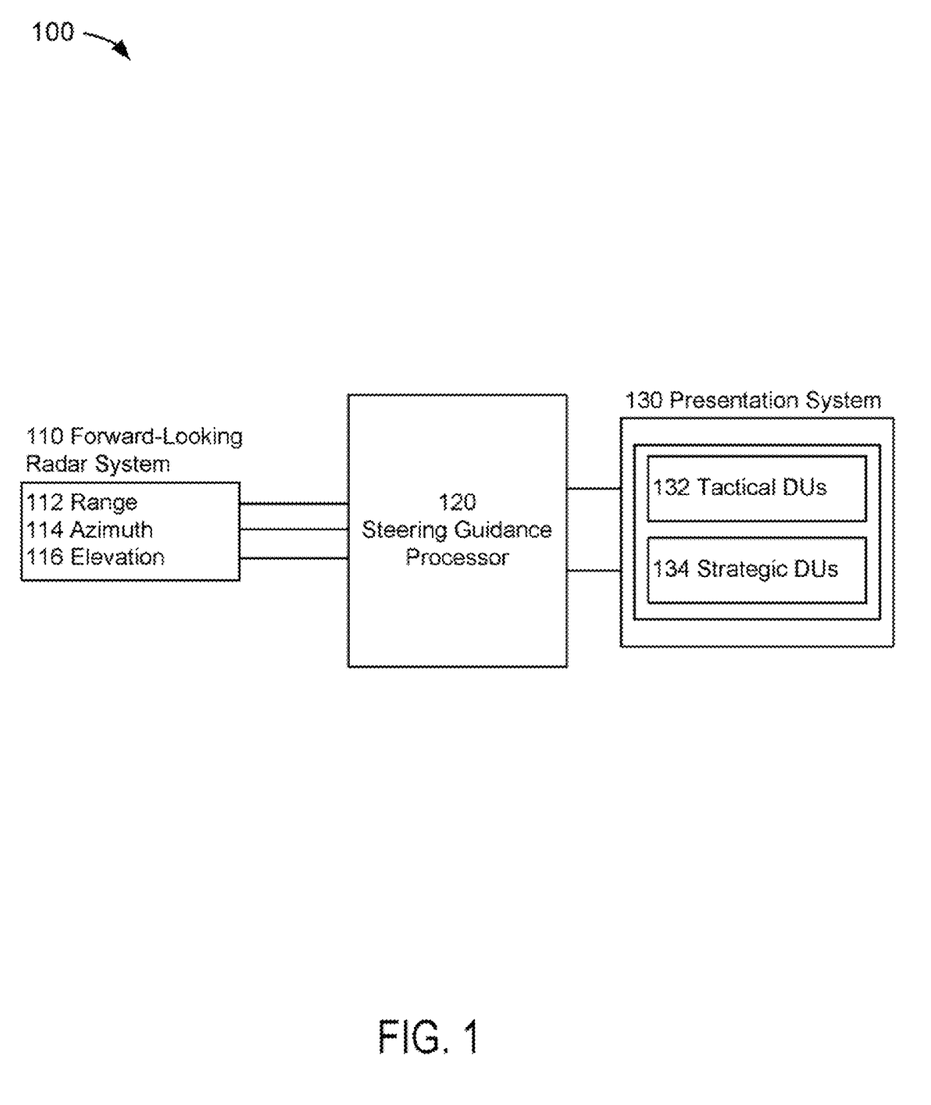
FIG. 1 depicts a block diagram of a steering symbology presentation system.

FIG. 1 depicts a steering symbology presentation system 100 suitable for implementation of the techniques described herein. The system may be comprised of a forward-looking radar system 110, a symbology generating ("SG processor") 120, and a presentation system 130.

A forward-looking radar system 110 is well-known to those skilled in the art. A common example of a forward-looking radar system 110 is a weather radar system. A forward-looking radar system 110 may be comprised of, in part, a transceiver and antenna. A transceiver may transmit microwaves within a sweep zone into the atmosphere via an antenna which, in turn, produces a focused beam. The transceiver may control the direction of the beam by steering the antenna horizontally and vertically. When the signal strikes or reflects off an object such as meteorological conditions, part of the microwave energy is reflected back and received by the antenna. The range 112 of the object may be determined by the transceiver by measuring the elapsed time between the transmission and reception of the signal. The azimuth 114 of the object may be determined as the angle to which the antenna was steered in the horizontal direction relative to the longitudinal axis of the aircraft during the transmission/reception of the signal. The elevation or elevation angle 116 of the object may be determined as the angle to which the antenna was steered in the vertical direction relative to the longitudinal axis of the aircraft during the transmission/reception of the signal. As embodied herein, a forward-looking radar system 110 could acquire hazard data including, but not limited to, range 112, azimuth 114, and elevation angle 116 of the hazard, and based upon the acquired signals, could determine the location of one or more hazards comprising hazard data.

One example of a forward-looking radar system is the WXR-2100 MultiScan Hazard Detection Weather Radar System ("Hazard Detection System") that has been developed by Rockwell Collins. The Hazard Detection System is an example of newer technologies which have departed from the traditional or classic weather radar systems. The Hazard Detection System could employ an automatic weather sensor operative to 320 nautical miles that displays not only classic precipitation rates but also significant weather hazards without pilot manipulation of tilt or gain settings typical of classic weather radar systems. The Hazard Detection System has many key features including, but not limited to, forward-looking windshear detection with turbulence alerts, geographic weather conditions, true zero automatic antenna misalignment compensation, overflight and predictive overflight protection, enhanced turbulence detection, flight phase hazard analysis, and storm top information. The Hazard Detection System could also include vertical display of range and height indicator, enhanced ground clutter suppression, and path attenuation compensation. As embodied herein, hazard data acquired by a forward-looking radar system 110 could include one or more of the preceding hazards, where the inclusion of such data could be configurable to a manufacturer or end-user. This hazard data could be provided to an SG processor 120 for subsequent processing as discussed below.

Although the Hazard Detection System employs a means for suppressing ground clutter, data associated with ground clutter may be employed as a source of providing terrain information. For example, the use of a forward-looking radar system in a terrain awareness and warning system ("TAWS") has been disclosed by McCusker et al in U.S. patent application Ser. No. 11/904,491 entitled "System and Method for Generating Alert Signals in a Terrain Awareness and Warning System of an Aircraft using a Forward-Looking Radar System." Also, the use of a forward-looking radar system in a TAWS has been disclosed by Wichgers et al in U.S. Pat. No. 8,234,020 entitled "System and Methods for Generating Alert Signals in a Terrain Awareness and Warning System." As embodied herein, hazard data could be data representative of terrain information acquired by a forward-looking radar system.

An SG processor 120 may receive input data from various systems including, but not limited to, hazard data from a forward-looking radar system 110 for processing as discussed herein. The input data such as hazard data may be used to determine a one or more minimum turn angles such as a minimum left turn angle and a minimum right turn angle based upon boundary tangents of the hazard data. SG processor 120 may generate steering symbology data that is representative of steering symbology corresponding to a minimum left turn angle or minimum right turn angle. SG processor 120 could determine steering symbology data by determining the screen position where the symbology would appear on a display unit; for example, a determination of the position made by SG processor 120 could include a scaling component to convert "world space" forward of the aircraft to "screen space." As embodied herein, steering symbology could be depicted as non-textual symbology, textual symbology, or both.

SG processor 120 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. SG processor 120 may be driven by the execution of software or source code containing algorithms developed for the specific functions embodied herein; alternatively, SG processor 120 may be implemented as an application-specific integrated circuit (ASIC). Common examples of electronic data processing units are microprocessors, Digital Signal processors (DSPs), Programmable Logic Devices (PLDs), Programmable Gate Arrays (PGAs), and signal generators; however, for the embodiments herein, the term SG processor 120 is not limited to such processing units and its meaning is not intended to be construed narrowly. For instance, SG processor 120 could also consist of more than one electronic data processing units. As embodied herein, SG processor 120 could be a processor(s) used by or in conjunction with any other system of the aircraft including, but not limited to, a processor(s) associated with a navigation system, a forward-looking radar system 110, a presentation system 130 which could comprise a vision system such as, but not limited to, a synthetic vision system ("SVS"), an enhanced vision system ("EVS"), a combined SVS-EVS, or any combination thereof; for example, although depicted separately in FIG. 1, SG processor 120 could be included in either of the separately enumerated systems.

SG processor 120 may be programmed or configured to receive as input data representative of information obtained from various systems and/or sources including, but not limited to, a forward-looking radar system 110. As embodied herein, the terms "programmed" and "configured" are synonymous. SG processor 120 may be electronically coupled to systems and/or sources to facilitate the receipt of input data; as embodied herein, operatively coupled may be considered as interchangeable with electronically coupled. SG processor 120 may be programmed or configured to execute the methods discussed in detail below. SG processor 120 may be programmed or configured to provide output data to various systems and/or units including, but not limited to, a presentation system 130. SG processor 120 may be electronically coupled to systems and/or units to facilitate the providing of output data. It is not necessary that a direct connection be made; instead, such receipt of input data and the providing of output data could be provided through a data bus or through a wireless network.

A presentation system 130 could be comprised of any unit which may present the pilot with steering symbology including, but not limited to, a tactical display unit(s) 132 and/or a strategic display unit(s) 134. As embodied herein and discussed above, a tactical display unit(s) 132 and/or a strategic display unit(s) 134 may included as part of a vision system (not shown) which generates an image data set which represents the image displayed on a display unit. Vision systems include, but are not limited to, SVS, EVS, combined SVS-EVS, or combination thereof.

A tactical display unit 132 could be any unit which presents tactical information to the crew relative to the instant or immediate control of the aircraft, whether the aircraft is in flight or on the ground. The tactical display unit 132 could be a Head-Up Display ("HUD") unit and/or a Head-Down Display ("HDD") unit. A HUD unit is mounted in front of the pilot at windshield level and is directly in the pilot's field of vision. The HUD system is advantageous because the display is transparent allowing the pilot to keep his or her eyes "outside the cockpit" while the display unit provides tactical flight information to the pilot. An HDD unit is typically a unit mounted to an aircraft's flight instrument panel located in front of a pilot and below the windshield.

The tactical display unit 132 could display the same information found on a primary flight display ("PFD"), such as "basic T" information (i.e., airspeed, attitude, altitude, and heading). Although it may provide the same information as that of a PFD, the tactical display unit 132 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The tactical display unit 132 is designed to provide flexible configurations which may be tailored to the desired configuration specified by a buyer or user of the aircraft.

The strategic display unit 134 could be any unit which presents strategic information to the crew relative to the intended future state(s) of the aircraft (e.g. intended location in space at specified times) along with information providing contextual information to the crew (e.g. terrain, navigation aids, geopolitical boundaries, airspace boundaries, etc.) about such state(s). One example of such display unit is commonly referred to as a Navigation Display. In some configurations, the strategic display unit could be part of an Electronic Flight Information System ("EFIS"). On these systems, hazard information may be displayed separately or simultaneously with information of other systems such as a navigation system and/or flight management system.

Figure 2:
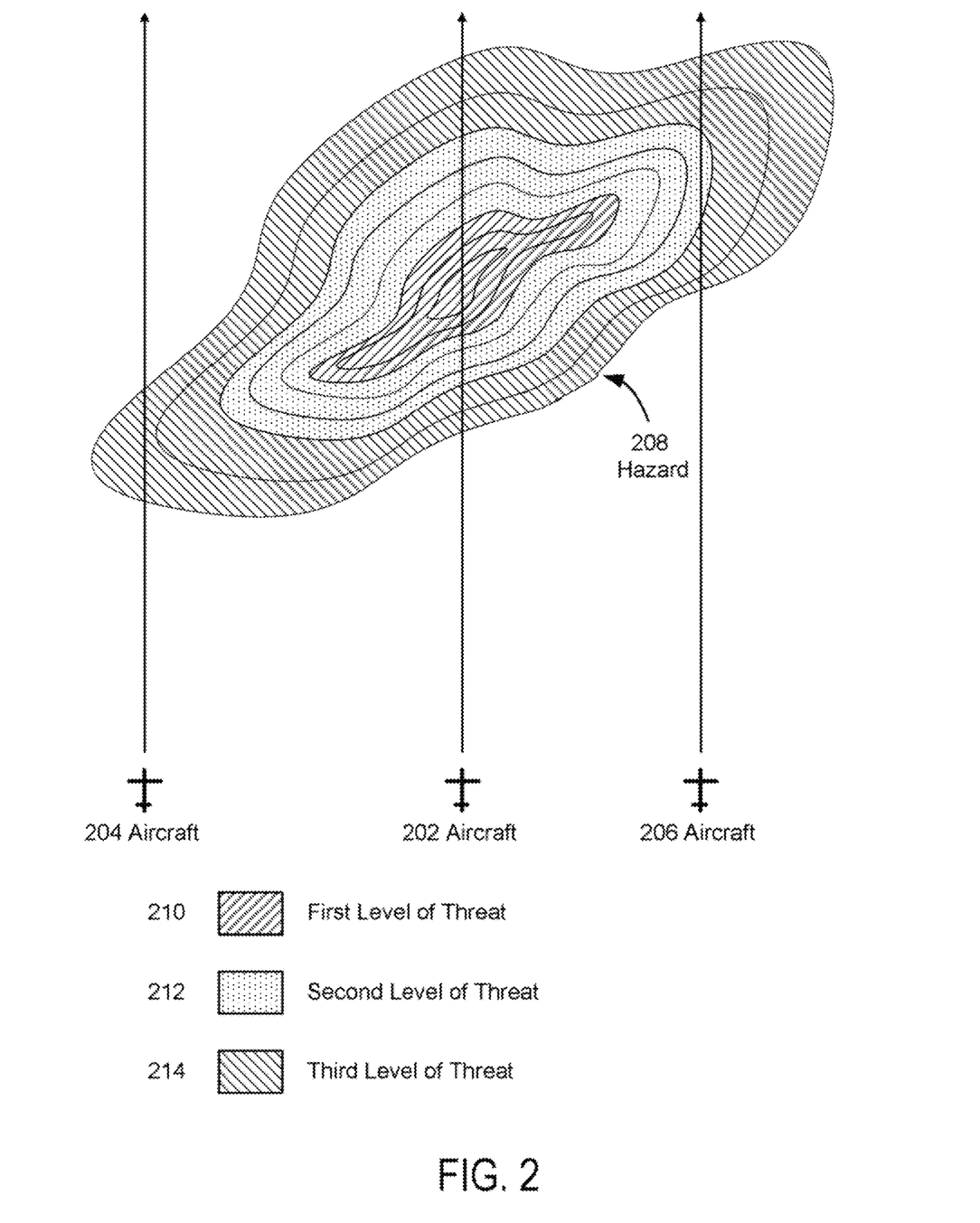
FIG. 2 depicts a "bird's eye" view of an aircraft flying towards a hazard.

The advantages and benefits of the embodiments discussed herein may be illustrated by showing examples of aircraft approaching a hazard. FIG. 2 depicts a "bird's eye" view of aircraft 202, 204, and 206 flying towards a hazard 208. As shown, hazard 208 may be comprised of one or more levels of hazards (i.e., threats). Item 210 depicts a first hazard level, item 212 depicts a second hazard level, and item 214 depicts a third hazard level. Each hazard level could be associated with a specific meteorological phenomenon such as, but not limited to, precipitation, snow, turbulence, and wind shear. Each hazard level could also be associated with terrain. Additionally or alternatively, each hazard level could be associated with a color that may be assigned for use in a weather radar system or a TAWS. For example, red could be associated with a first level of threat, amber or yellow could be associated with the second level, and green could be associated with a third level.

Figure 3A:
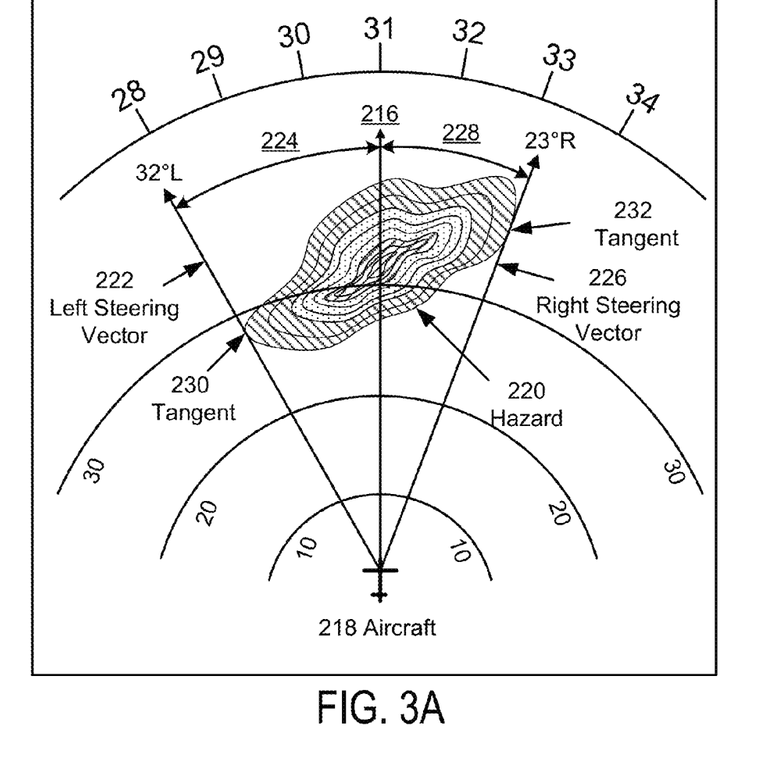
Figure 3B:
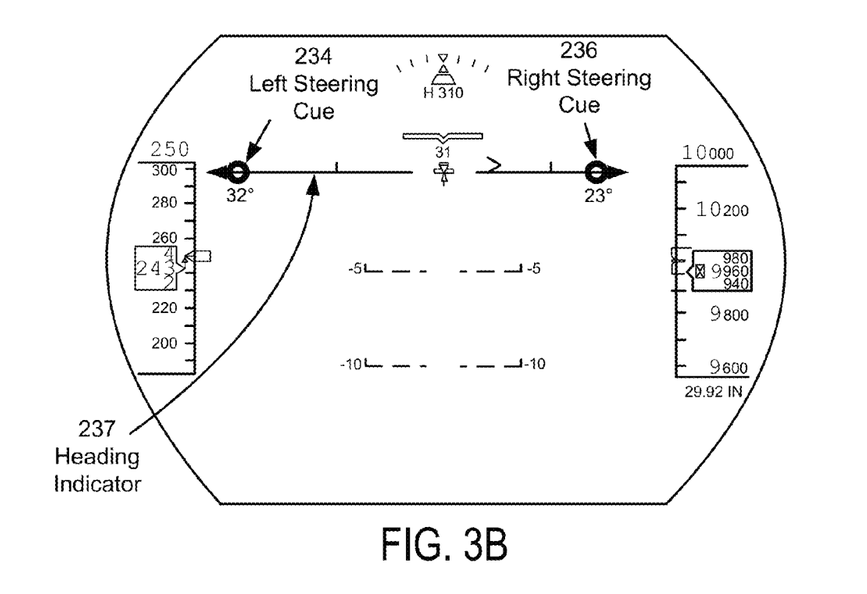
Figure 4A:
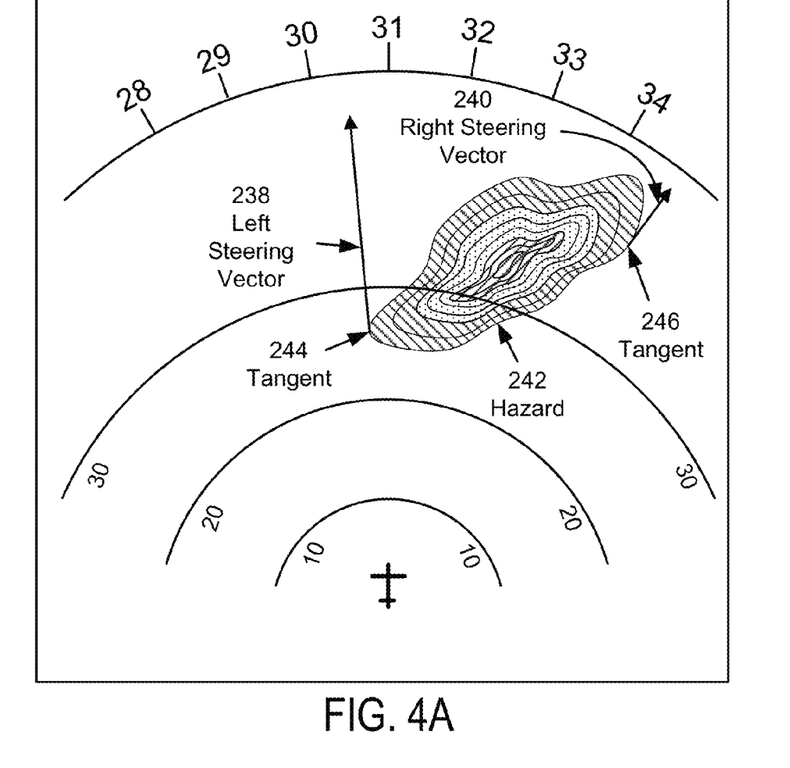
Figure 4B:
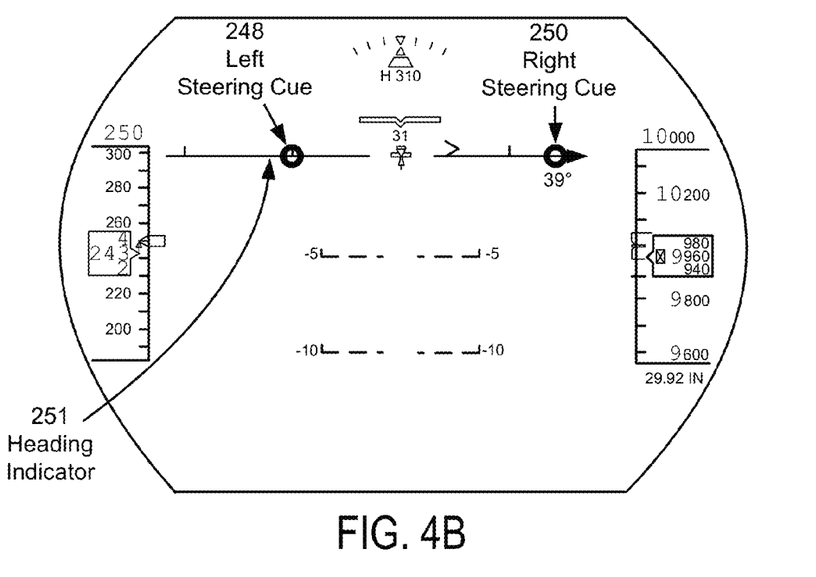
Figure 5A:
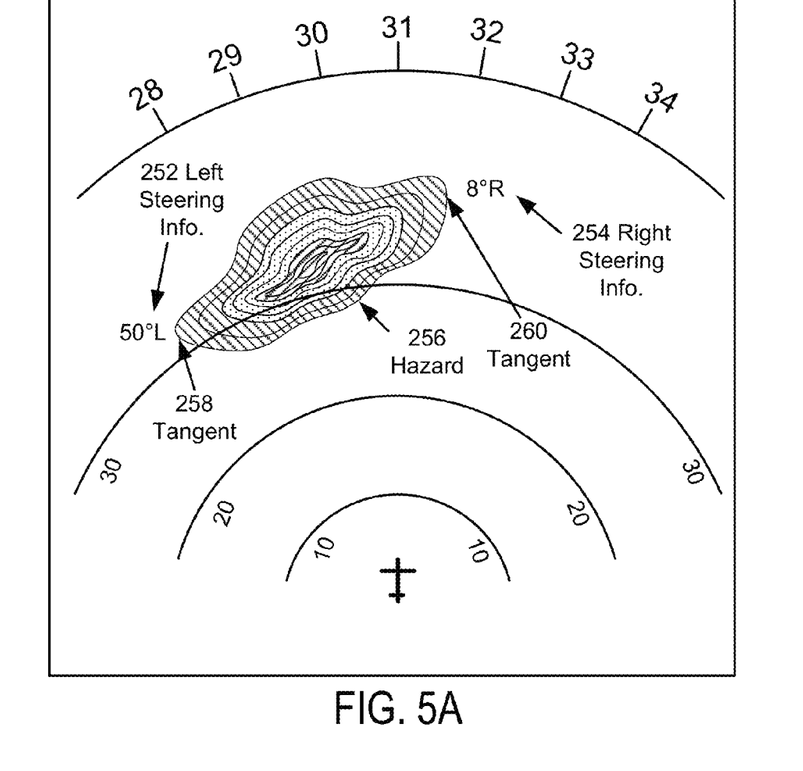
Figure 5B:
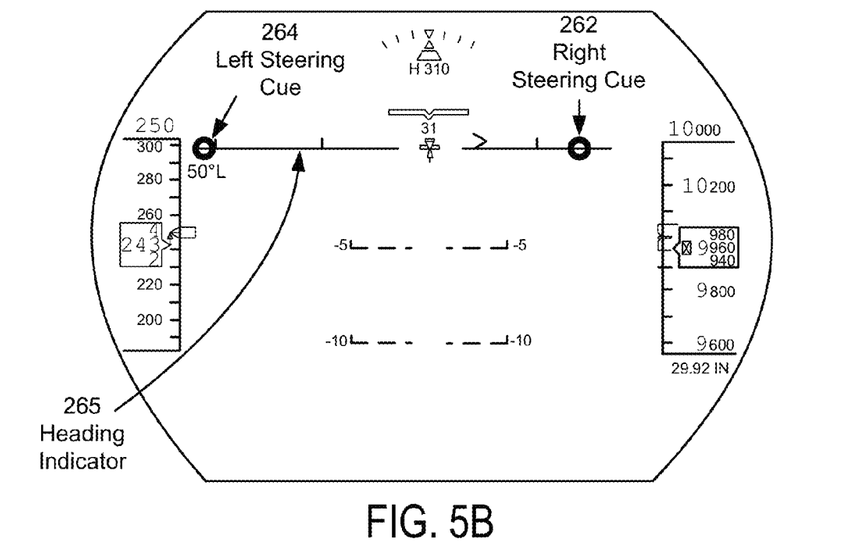

The drawings of FIGS. 3 through 5 provide exemplary depictions of a strategic display unit and tactical display unit presenting steering information to the pilot for steering around a threat detected by a forward-looking radar system 110. As a preliminary matter, the strategic display unit could display an extensive amount of information to the pilot, information that could be provided from a plurality of aircraft systems. It should be noted that the extensiveness of this information has been intentionally omitted from the strategic display unit shown in FIG. 3 for the sake of the presentation only and discussion that follows herein. The omission of a plurality of indications or information is not indicative of the plurality of indications or information with which the presentation of steering information disclosed herein may be configured, nor is it intended to be a limitation of the embodiments disclosed herein.

FIG. 3A depicts steering symbology depicted on a strategic flight display. As shown, the projected flight track 216 of the aircraft 218 indicates the aircraft will fly over the approximate center of image of the hazard 220. For the purpose of illustration and discussion, the depiction of the aircraft 218 and the image of hazard 220 may illustratively correspond to aircraft 202 approaching hazard 208 shown in FIG. 2, respectively, where the hazard image may correspond to one or more levels of threat and location data of such threat(s) acquired from a forward-looking radar system 110. Left steering vector 222 forms a left turn angle 224 with the projected flight track 216, and right steering vector 226 forms a right turn angle 228 with the projected flight track 216. Although the discussion herein is drawn to a single, isolated hazard, the embodiments herein are not limited to such but could include more than one isolated hazards.

It should be noted that, for the sole purpose of illustration and not limitation, the longitudinal axis of aircraft 218 discussed herein will assume to coincide or align with a track. Those skilled in the art understand that this may not occur in flight. For example, the presence of a cross-wind could create a situation where the longitudinal axis and/or aircraft heading do not coincide or align with the track of the aircraft. In such event, track alignment correction information such as, but not limited to, a wind correction angle may be determined and applied to the determination of left and right turn angles. In one embodiment, the forward-looking radar system may calculate aircraft track angle directly from information contained within radar return signals.

As embodied herein, the SG processor 120 could determine the location of left and right steering vectors 222 and 226 by determining the tangent points 230 and 232 of a hazard boundary to the left and right, respectively, as a function of the level of threat and location data. Left tangent point 230 and right tangent point 232 may be the respective points which correspond to the minimum values for left turn angle 224 and right turn angle 228, respectively, required to avoid hazard 220. Left tangent point 230 and right tangent point 232 could be determined by finding the maximum hazard angle between the current position of the aircraft and the respective boundaries of the hazard to the left and right. In an embodiment herein, the left turn angle 224 may equal the left maximum hazard angle and the right turn angle 228 may equal the right maximum hazard angle. This could be accomplished through an iterative process of the hazard data to determine the points of the hazard data which create the maximum or greatest hazard angle between the aircraft and both the left tangent point 230 and right tangent point 232 of the hazard data. As illustrated in FIG. 3A, the minimum left turn angle has been determined to be 32 degrees (32° L), and the minimum right turn angle has been determined to be 23 degrees (23° R). From this information, the pilot is informed that a minimum turn of 32° to the left or 23° to the right will be required to avoid hazard 220.

Steering information discussed for FIG. 3A may be depicted on a tactical flight display (i.e., a HUD display). FIG. 3B is illustrative of non-textual and textual steering symbologies that may be used in an egocentric centric display. Left steering cue 234 and right steering cue 236 comprise of non-textual and textual information, and as shown, each provide the pilot with the minimum turn angle information determined to avoid hazard 220. For the purpose of illustration only and not limitation, the shape of the steering cue is shown as a donut. Also, because the minimum left turn angle of 32° and the minimum right turn angle of 23° exceed the range of the heading indicator scale (shown as item 237), additional non-textual and/or textual information may be provided to the pilot. As depicted in FIG. 3B, an additional graphic of a left direction arrow and the text "32°" are included with the left steering cue 234 to inform the pilot that a left turn of 32 degrees will be necessary to avoid hazard 220 to the left; similarly, a right direction arrow and the text "23°" are included with the right steering cue 236 to inform the pilot that a right turn of 23 degrees will be necessary to avoid hazard 220 to the right. From the presentation of this symbology of FIG. 3B, the pilot is informed that a minimum turn of 32° to the left or 23° to the right will be required to avoid hazard 220. Moreover, the left steering cue and right steering cue are not limited to the lateral plane; instead, steering cues could be placed above or below the horizon indication to indicate that a climb or descent (i.e., in the vertical direction) may be required to avoid the hazard.

As shown in the drawings of FIGS. 3A and 3B, both non-textual and textual symbology are illustrated even though one could have been used without the other. In FIG. 3A, left steering vector 222 and right steering vector 226 illustrate non-textual symbology and the indications of "32°" and "23°" illustrate textual symbology. Likewise, in FIG. 3B, a donut and direction arrow of each the left steering cue 234 and right steering cue 236 illustrate non-textual symbology and the "32°" and "23°" illustrate textual symbology. In one embodiment, a manufacturer or end user may choose to provide steering symbology in only one direction; for example, the steering symbology provided could correspond to the lesser value of the two minimum turn angles. In another embodiment, it is not necessary to include both non-textual and textual symbology; also, non-textual symbology is not limited to a donut symbol when another symbol may be configured to depict non-textual steering information. The embodiments herein may include a plurality of configurations of steering symbology from which a manufacturer or end user may choose to convey hazard avoidance steering information through symbology based upon the hazard data provided by a forward-looking radar system 110.

FIG. 4A depicts steering symbology depicted on a strategic flight display for aircraft 204 approaching hazard 208 shown in FIG. 2. To illustrate the plurality of configurations for steering symbology, only non-textual symbology comprising of a left steering vector 238 and right steering vector 240 are depicted with hazard 242. When compared with the steering vectors 222 and 226 of FIG. 3A, left and right steering vectors 238 and 240 of FIG. 4A have been truncated, originating from corresponding tangent points 244 and 246. As discussed above, the SG processor 120 could determine the location of left and right steering vectors 238 and 240 by determining the tangent points of a hazard boundary to the left and right, respectively, as a function of the level of threat and location data. Although the values of the minimum left turn angle and minimum right turn angle do not appear as textual symbology in FIG. 4A, these angles have been determined by the SG processor 120 to be 5 degrees (5°), and 39 degrees (39°), respectively. From the display of the non-textual symbology, the pilot is informed that a left turn to approximate heading of 305° (310°−5°) or right turn to the approximate hearing of 349° (310°+39°) will be required to avoid hazard 242.

Steering information discussed for FIG. 4A may be depicted on a tactical flight display. FIG. 4B depicts steering symbology depicted on a tactical flight display using the minimum left turn angle of 5° and minimum right turn angle of 39° as determined in FIG. 4A. The symbology of the left steering cue 248 comprises of non-textual information while the symbology of the right steering cue 250 comprises both non-textual and textual information of FIG. 3B. Because the amount of the minimum left turn angle of 5° falls within the scale of the headng indicator (shown as item 251), additional textual information is not needed. Other the other hand, the presence of textual symbology "39°" informs the pilot that a turn of 39° exceeds the range of the heading indicator scale presented on the display unit. From the presentation of this symbology of FIG. 4B, the pilot is informed that a minimum turn of 5° to the left or 39° to the right will be required to avoid hazard 242.

FIG. 5A depicts steering symbology depicted on a strategic flight display for aircraft 206 approaching hazard 208 shown in FIG. 2. To illustrate the plurality of configurations for steering symbology, only textual symbology comprising of left steering information 252 and right steering information 254 are depicted adjacent to hazard 256. As discussed above, the SG processor 120 could determine the values of the minimum left turn angle and minimum right turn angle based on the locations of tangents 258 and 260. In FIG. 5A, the minimum left turn angle and minimum right turn angle have been determined by the SG processor 120 to be 50 degrees (50° L), and 8 degrees (8° R), respectively. From the display of the textual symbology of "50° L" and "8° R" displayed adjacent to the tangents 258 and 260, the pilot is informed that a minimum left turn of 50° or a minimum right turn of 8° will be required to avoid hazard 256.

Steering information discussed for FIG. 5A may be depicted on a tactical flight display. FIG. 5B depicts steering symbology depicted on a tactical flight display using the minimum left turn angle of 50° and minimum right turn angle of 8° as determined in FIG. 5A. The symbology of the right steering cue 262 comprises of non-textual information while the symbology of the left steering cue 264 comprises both non-textual and textual information. Because the amount of the minimum right turn angle of 8° falls within the scale of the heading indicator (shown as item 265), additional textual information is not needed. Other the other hand, the presence of textual symbology "50° L" in the right steering cue 264 informs the plot that a turn to the right of 50° exceeds the range of the heading indicator scale presented on the display unit. From the presentation of this symbology of FIG. 5B, the pilot is informed that a minimum turn of 8° to the right or 50° to the left will be requied to avoid hazard 256.

Figure 6:
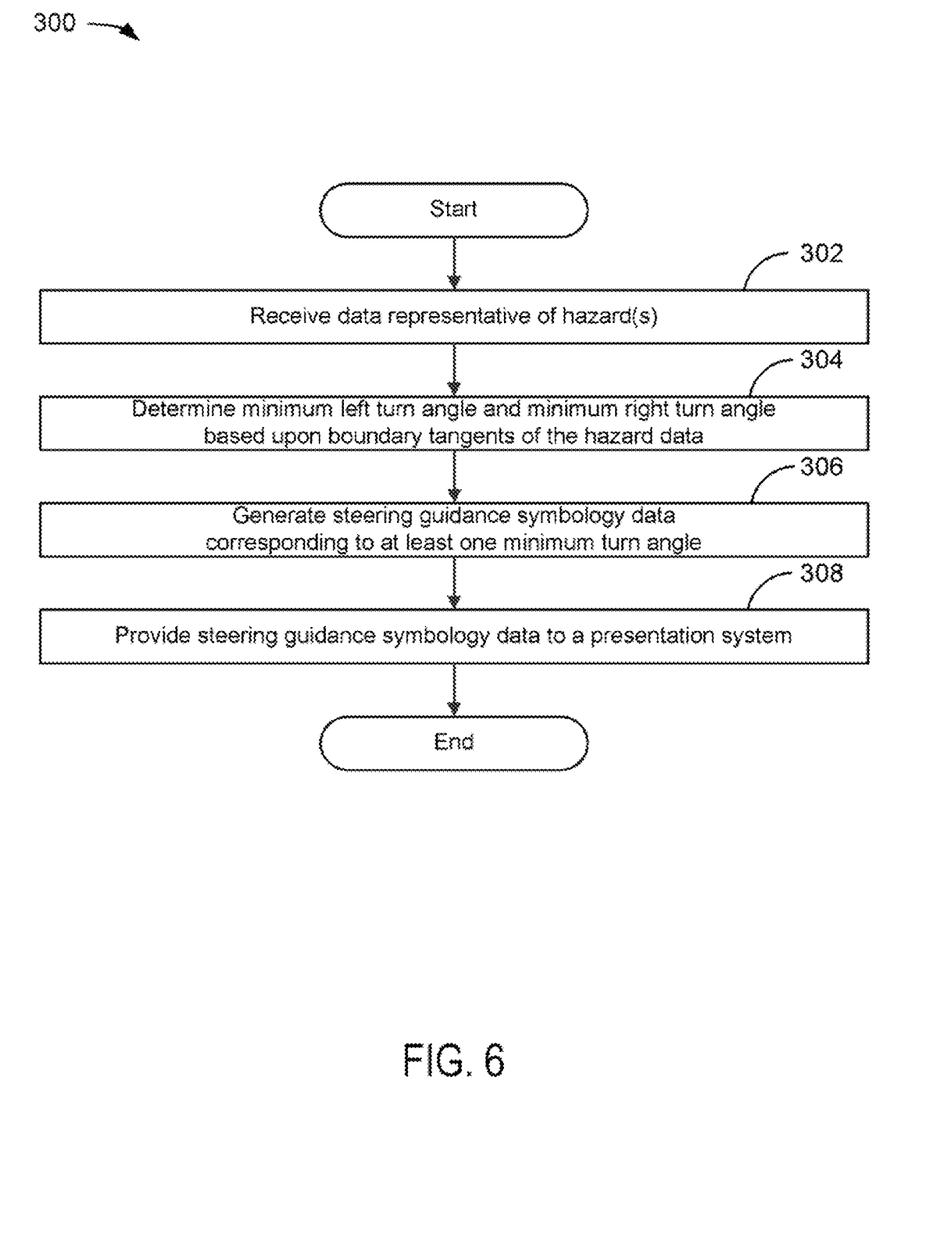
FIG. 6 provides a flowchart illustrating a method for presenting steering symbology using data acquired by a forwarding-looking radar system.

FIG. 6 depicts a flowchart 300 of an example of a method for presenting steering symbology using data acquired by a forwarding-looking radar system. The flowchart begins with module 302 with the receiving of data representative of hazard information and acquired by a forwarding-looking radar system, where such data could be received by an SG processor 120. In one embodiment, this hazard data could include of one or more levels of threats. In another embodiment, the hazard information could be comprised of more than one isolated hazards, and each hazard could include one or more levels of threat. In another embodiment, a level of threat could correspond to a specific meteorological condition. In another embodiment, a level of threat could correspond to terrain measurements. In another embodiment, data representative of a wind correction angle or aircraft track angle may be received, where such angles may be calculated directly from information contained within radar return signals.

The flowchart continues with module 304 with the determining of a minimum left turn angle and minimum right turn angle based on hazard boundary tangents. Hazard boundary tangent for each direction could be determined by finding the maximum hazard angle between the current position of the aircraft and the boundary of the hazard. In an embodiment herein, the left turn angle may equal the left maximum hazard angle and the right turn angle may equal the right maximum hazard angle. This could be accomplished through an iterative process of the hazard data performed by an SG processor 120 to determine which points of the hazard data creates the maximum or greatest angle between the aircraft and the left and right outer edges of the hazard data, and these maximum hazard angles may correspond the minimum turn angles required for hazard avoidance. As embodied herein, the minimum left turn angle and minimum right turn angle are not limited to the lateral plane but could include a vertical component for indicating a climb or descent. As embodied herein, hazard data could be associated with specific levels of threat, and if so, a manufacturer or end-user may configure the determining of minimum left turn angle and minimum right turn angle as a function of a level of threat. In an additional embodiment, the determination of a minimum left turn angle and minimum right turn angle could be adjusted using data representative of track alignment correction information.

The flowchart continues with module 306 with the generating of steering symbology data corresponding to one or more minimum turn angles determined in module 304. As embodied herein, steering symbology data could be generated by an SG processor 120 and comprise of non-textual symbology data, textual symbology data, or both for display one or more display units including, but not limited to, a tactical display unit and a strategic display unit. Non-textual symbology data could be data representative of steering information that will be provided on one or more display units in non-textual form, and textual symbology data could be data representative of steering information provided to the pilot or flight crew in textual form. As embodied herein, a manufacturer or end-user may choose a configuration to display a left or right minimum turn angle only, where the direction chosen corresponds to the smaller angular measurement.

The flowchart continues with module 308 with providing steering symbology data to a presentation system 130 by an SG processor 120 for display of steering symbology on one or more display units such as a tactical display unit 132, a strategic display unit 134, or both. When presented to the pilot or flight crew on a display unit, the steering symbology could be non-textual, textual, or a combination of both. Then, the flowchart proceeds to the end.

It should be noted that the method steps described above are embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. An airborne radar-based system for presenting steering symbology on an aircraft display unit, said system comprising:
a forward-looking aircraft radar system;
a symbology generating processor configured to
receive hazard data from the forward-looking aircraft radar system configured to acquire hazard data, where the hazard data is representative of hazard and wind correction information,
determine a plurality of minimum turn angles based upon boundary tangents of the hazard and wind correction information, where
such plurality includes a minimum left turn angle and a minimum right turn angle,
generate first steering symbology data, where
such first steering symbology data is representative of first steering symbology corresponding to a first minimum turn angle and comprised of a first non-textual, hazard avoidance steering cue presented in a tactical display image, where
the tactical display image is comprised of at least
an airspeed indicator,
an altitude indicator,
a heading indicator, and
an attitude indicator comprised of at least pitch and roll indications, and
provide the first steering symbology data to a presentation system; and
the presentation system configured to
receive the first steering symbology data, whereby
the first non-textual, hazard avoidance steering cue of the first steering symbology data is superimposed against the heading indicator depicted on a tactical display unit.

2. The system of claim 1, wherein
the first non-textual, hazard avoidance steering cue is comprised of
a steering vector if the first minimum turn angle does not fall within a scale of the heading indicator, and
a donut.

3. The system of claim 2, wherein
the first steering symbology if further comprised of
first textual information if the first minimum turn angle does not fall within the scale of the heading indicator.

4. The system of claim 1, wherein the first minimum turn angle is based upon the smaller angular measurement of either the minimum left turn angle or the minimum right turn angle.

5. The system of claim 1, wherein
the symbology generating processor is further configured to
generate second steering symbology data, where
such second steering symbology data is representative of second steering symbology corresponding to a second minimum turn angle and comprised of a second non-textual, hazard avoidance steering cue presented in the tactical display image, and
provide the second steering symbology data to the presentation system; and
the presentation system is further configured to
receive the second steering symbology data, whereby
the second non-textual, hazard avoidance steering cue of the second steering symbology data is superimposed against the heading indicator depicted on a tactical display unit.

6. The system of claim 5, wherein the second minimum turn angle is based upon the greater angular measurement of either the minimum left turn angle or the minimum right turn angle.

7. The system of claim 1, wherein the symbology generating processor is a processor of the forward-looking aircraft radar system or the presentation system.

8. An airborne radar-based module for presenting steering symbology on an aircraft display unit, said module comprising:
an input communications interface to facilitate a providing of hazard data to a symbology generating processor;
the symbology generating processor configured to
receive hazard data from the forward-looking aircraft radar system configured to acquire hazard data, where the hazard data is representative of hazard and wind correction information,
determine a plurality of minimum turn angles based upon boundary tangents of the hazard and wind correction information, where
such plurality includes a minimum left turn angle and a minimum right turn angle,
generate first steering symbology data, where
such first steering symbology data is representative of first steering symbology corresponding to a first minimum turn angle and comprised of a first non-textual, hazard avoidance steering cue presented in a tactical display image, where
the tactical display image is comprised of at least
an airspeed indicator,
an altitude indicator,
a heading indicator, and
an attitude indicator comprised of at least pitch and roll indications, and
provide the first steering symbology data an output communications interface, whereby
the first non-textual, hazard avoidance steering cue of the first steering symbology data is superimposed against the heading indicator depicted on a tactical display unit; and
the output communications interface to facilitate a providing of the first steering symbology data from the symbology generating processor to a presentation system.

9. The module of claim 8, wherein
the first non-textual, hazard avoidance steering cue is comprised of
a steering vector if the first minimum turn angle does not fall within a scale of the heading indicator, and
a donut.

10. The module of claim 9, wherein
the first steering symbology if further comprised of
first textual information if the first minimum turn angle does not fall within the scale of the heading indicator.

11. The module of claim 8, wherein the first minimum turn angle is based upon the smaller angular measurement of either the minimum left turn angle or the minimum right turn angle.

12. The module of claim 8, wherein
the symbology generating processor is further configured to
generate second steering symbology data, where
such second steering symbology data is representative of second steering symbology corresponding to a second minimum turn angle and comprised of a second non-textual, hazard avoidance steering cue presented in the tactical display image, and
provide the second steering symbology data to the output communications interface, whereby
the second non-textual, hazard avoidance steering cue of the second steering symbology data is superimposed against the heading indicator depicted on a tactical display unit.

13. The module of claim 12, wherein the second minimum turn angle is based upon the greater angular measurement of either the minimum left turn angle or the minimum right turn angle.

14. The module of claim 8, wherein the module is a module of the forward-looking aircraft radar system or the presentation system.

15. An airborne radar-based method for presenting steering symbology on an aircraft display unit, said method comprising:
receiving hazard data from the forward-looking aircraft radar system configured to acquire hazard data, where the hazard data is representative of hazard and wind correction information;

determining a plurality of minimum turn angles based upon boundary tangents of the hazard and wind correction information, where
such plurality includes a minimum left turn angle and a minimum right turn angle;
generating first steering symbology data, where
such first steering symbology data is representative of first steering symbology corresponding to a first minimum turn angle and comprised of a first non-textual, hazard avoidance steering cue presented in a tactical display image, where
the tactical display image is comprised of at least
an airspeed indicator,
an altitude indicator,
a heading indicator, and
an attitude indicator comprised of at least pitch and roll indications; and
providing the first steering symbology data to a presentation system, whereby
the first non-textual, hazard avoidance steering cue of the first steering symbology data is superimposed against the heading indicator depicted on a tactical display unit.

16. The method of claim 15, wherein
the first steering symbology if further comprised of
first textual information if the first minimum turn angle does not fall within a scale of the heading indicator.

17. The method of claim 16, wherein
the first non-textual, hazard avoidance steering cue is comprised of
a steering vector if the first minimum turn angle does not fall within the scale of the heading indicator, and
a donut.

18. The method of claim 15, wherein the first minimum turn angle is based upon the smaller angular measurement of either the minimum left turn angle or the minimum right turn angle.

19. The method of claim 15, further comprising:
generating second steering symbology data, where
such second steering symbology data is representative of second steering symbology corresponding to a second minimum turn angle and comprised of a second non-textual, hazard avoidance steering cue presented in the tactical display image; and
providing the second steering symbology data to a presentation system, whereby
the first non-textual, hazard avoidance steering cue of the second steering symbology data is superimposed against the heading indicator depicted on a tactical display unit.

20. The method of claim 19, wherein the second minimum turn angle is based upon the greater angular measurement of either the minimum left turn angle or the minimum right turn angle.

* * * * *